(12) United States Patent
Hamke et al.

(10) Patent No.: US 6,393,830 B1
(45) Date of Patent: May 28, 2002

(54) HYBRID ROCKET PROPULSION SYSTEM INCLUDING ARRAY OF HYBRID OR FLUID ATTITUDE-CONTROL ROCKET ENGINES

(75) Inventors: Rolf E. Hamke, Plano, TX (US); Eric M. Rohrbaugh, Hagerstown, MD (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/532,301

(22) Filed: Mar. 22, 2000

Related U.S. Application Data
(60) Provisional application No. 60/126,377, filed on Mar. 26, 1999.

(51) Int. Cl.[7] .............................. F02K 9/42; F02K 9/72
(52) U.S. Cl. .............................. 60/229; 60/251; 60/257
(58) Field of Search .......................... 60/229, 251, 257, 60/258, 259, 213

(56) References Cited

U.S. PATENT DOCUMENTS

| | | | | |
|---|---|---|---|---|
| 2,637,161 A | * | 5/1953 | Tschinkel | 60/213 |
| 3,102,386 A | | 9/1963 | Proell | |
| 3,107,485 A | | 10/1963 | Toulmin, Jr. | 60/35.4 |
| 3,112,611 A | | 12/1963 | Adamson | |
| 3,135,088 A | * | 6/1964 | Holmes | 60/213 |
| 3,311,130 A | * | 3/1967 | Caldwell | 60/258 |
| 3,557,556 A | | 1/1971 | Muzzy | 60/207 |
| 3,584,461 A | | 6/1971 | Debize et al. | 60/251 |
| 3,677,011 A | | 7/1972 | Vickland | 60/251 |
| 3,732,693 A | | 5/1973 | Chu | 60/207 |
| 4,527,389 A | | 7/1985 | Biddle et al. | 60/207 |
| 4,787,579 A | | 11/1988 | Smith | 244/169 |
| 5,799,902 A | | 9/1998 | Keith et al. | |

FOREIGN PATENT DOCUMENTS

GB      1 439 368      6/1976

OTHER PUBLICATIONS

Patent Abstracts of Japan, 8177629 (1996).

* cited by examiner

*Primary Examiner*—Louis J. Casaregola
(74) *Attorney, Agent, or Firm*—Sullivan Law Group

(57) ABSTRACT

This propulsion system of a rocket motor assembly includes an array of attitude-control rocket engines, one or more oxidizer-fluid sources, one or more ignition-fluid sources, and, optionally, one or more primary rocket engines. Each of the attitude-control rocket engines has a respective combustion chamber and is offset from the longitudinal axis of the rocket motor assembly so that when a selected one or group of the attitude-control rocket engines is fired, the flight path of the assembly is diverted and/or the rocket assembly spins. The oxidizer-fluid and ignition-fluid sources are in operative communication with the attitude-control rocket engines to respectively permit oxidizer fluid and ignition fluid to be supplied to selected ones or groups of the attitude-control rocket engines. Optionally, a portion of the ignition fluid from the ignition-fluid source can be cooled and used to pressurize the oxidizer-fluid source.

19 Claims, 3 Drawing Sheets

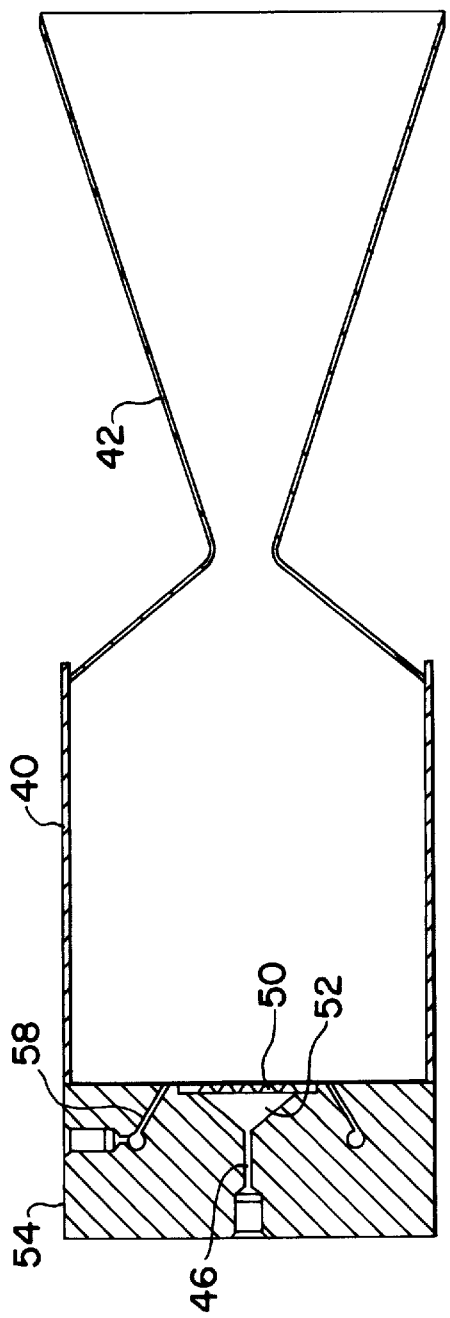
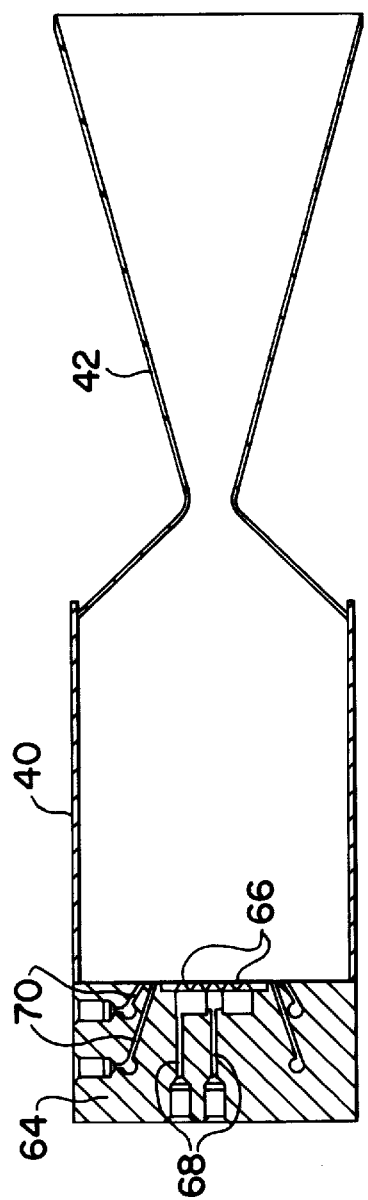

HYBRID ROCKET PROPULSION SYSTEM INCLUDING ARRAY OF HYBRID OR FLUID ATTITUDE-CONTROL ROCKET ENGINES

RELATED APPLICATIONS

Priority is claimed of provisional application 60/126,377 filed in the U.S. Patent & Trademark Office on Mar. 26, 1999, the complete disclosure of which is incorporated herein by reference.

BACKGROUND OF THE INVENTION

1. Field of the Invention

The present invention relates to a rocket propulsion system which includes an array of eccentric rocket engines that function as thrusters and/or divert engines for controlling the direction of flight of the rocket assembly.

2. Description of the Related Art

In the art relating to aerospace vehicles, various types of propulsion systems are known. A large number of these systems are constructed to provide thrust as well as attitude control. Each of these systems has its own characteristic advantages and disadvantages.

However, existing propulsion systems and attitude and control systems have certain drawbacks in that they are unable to achieve a combination of a high energy density and controllable thrust found with solid propulsion system and, at the same time, exhibit the reliable shut down and re-ignition capabilities of a liquid or hybrid system.

BRIEF SUMMARY OF THE INVENTION

It is an object of the present invention to provide a rocket motor assembly including a propulsion system having a high propulsion capacity, yet which allows individual engines or sets of engines to be independently shut down and reliably re-ignited as desired to achieve accurate attitude control.

The propulsion systems according to this invention include an array of eccentric rocket engines each having a combustion chamber. As referred to herein, eccentric means that the rocket engines are offset from the longitudinal axis of the rocket motor assembly so that firing of selected ones or groups of the eccentric rocket engines permits attitude control over the rocket assembly. (Although the eccentric rocket engines are individually offset from the longitudinal axis of the rocket assembly, the eccentric motors can, for example, collectively form a concentric ring about the longitudinal axis of the rocket assembly, so that the simultaneous firing of certain or all of the eccentric rocket motors thrusts the rocket assembly without attitude adjustment.) As referred to herein, attitude control means influencing the pitch, yaw, and/or roll of the rocket assembly in flight.

The propulsion systems further include one or more oxidizer-fluid sources, e.g., storage tanks, in operative communication with the eccentric rocket engines to permit oxidizer fluid to be supplied from the oxidizer-fluid sources to the combustion chambers of the eccentric rocket engines. For example, one oxidizer-fluid source can be provided that delivers oxidizer fluid to each of the eccentric rocket engines. Alternatively, a plurality of oxidizer-fluid sources can each communicate with a corresponding one or groups of eccentric rocket engines. Representative oxidizer fluids include solutions, slurries, or gels containing primary oxidizers such as hydrogen peroxide, nitrogen tetroxide, inhibited red fuming nitric acid (IRFNA), hydroxyl ammonium nitrate (HAN), ammonium nitrate (AN), ammonium perchlorate, hydroxyl ammonium perchlorate (HAP), and other oxidizers well known in the art.

One or more ignition-fluid sources, e.g., storage tanks, are placed in operative communication with the eccentric rocket engines to permit ignition fluid to be delivered to the combustion chambers of the eccentric rocket engines. Again, one ignition-fluid source can deliver ignition fluid to each of the eccentric rocket engines. Alternatively, a plurality of ignition-fluid sources can each deliver ignition fluid to a corresponding one or group of eccentric rocket engines.

In a first preferred embodiment of the invention, the eccentric rocket engines are hybrid rocket engines housing solid fuel grains. In this embodiment, when hot ignition fluid, typically in a gaseous state, is introduced into the combustion chambers together with the oxidizer fluid, a combustion reaction ensues. Once ignition has occurred, the flow of hot ignition fluid into the combustion chambers can be terminated without stopping the combustion reactions, since a solid fuel source is already present in the combustion chamber. The combustion reaction can be terminated by terminating the flow of oxidizer fluid from the oxidizer-fluid source to the combustion chamber of the hybrid rocket engines. The solid fuel grain can be devoid of solid oxidizer or can contain small amounts of solid oxidizer, so long as the solid oxidizer is not present in the grain in sufficient concentrations to create a self-deflagrating reaction.

In a second preferred embodiment of the invention, the eccentric rocket engines are bi-fluid rocket engines. In this embodiment, the ignition/fuel source, which may be, by way of example, a gas generator containing a solid propellant that is converted by controlled combustion into a hot gas, can deliver the fuel component for the combustion reaction and simultaneously supply the heat necessary for ignition. In the bi-fluid embodiment, the ignition/fuel source generally should be supplied to the combustion chamber at a higher flow rate than for the hybrid rocket engine of the first preferred embodiment, since unlike a hybrid rocket engine, a bi-fluid engine does not contain a solid fuel grain in the combustion chamber. When the ignition/fuel fluid and oxidizer fluid are both delivered into the combustion chambers, a combustion reaction ensues. The combustion reaction can be stopped by terminating the flow of oxidizer fluid and/or ignition/fuel fluid to the combustion chamber of the bi-liquid rocket engines.

In accordance with a third embodiment of the invention, the eccentric rocket engines are single-fluid engines, in which the fluid supplied to all of the engines is generated and delivered from a single or multiple sources of combustion products, with at least some of said sources being connected to at least two eccentric rocket engines. In this embodiment, firing of the eccentric rocket engines is controlled by permitting and terminating the flow of combustion products to the eccentric rocket engines individually.

It is also within the scope of this invention to use combinations of hybrid rocket engines and bi-fluid rocket engines. Preferably, the eccentric rocket engines are connected to the oxidizer-fluid source and ignition-fluid source with respective control valves, which more preferably permit the variable throttling, shut down, and re-starting of selected ones or groups of the eccentric rocket engines independently of one another.

The propulsion system of this invention optionally, and in some embodiments preferentially, includes an axial primary engine or a plurality of primary engines constructed and arranged to collectively produce thrust force along the axial or longitudinal direction. When present, the primary engine or engines are preferably the main propulsion source so as to produce a higher level of thrust than the eccentric engines in the array produce individually. The primary engine or engines can be hybrid engine(s), reverse hybrid engine(s), bi-fluid engine(s), self-deflagrating solid propellant engine (s), or dual chamber solid engine(s). The primary engine or engines can receive the oxidizer and/or fuel from the oxidizer-fluid source(s) and fuel-fluid source(s), respectively.

In accordance with a preferred modification to the invention, the propulsion system further includes at least one cooling device operatively connecting the ignition-fluid source(s) to the oxidizer-fluid source(s). A portion of the ignition fluid from the ignition-fluid source is sent through the cooling device to lower the temperature of the ignition fluid, and then is used to pressurize fluid oxidizer in the oxidizer-fluid source. Although various mechanical and pneumatic set ups can be envisioned, by way of example, the oxidizer source can be provided with a piston or an expandable or collapsible bladder or like device for keeping the oxidizer liquid and cooled ignition fluid separate.

There is a possibility, in accordance with a less preferred embodiment of the present invention, of a separate cold and warm gas oxidizer pressurization system for the oxidizer-fluid source by means within the purview of a skilled artisan. While this option offers a degree of simplicity and reliability, it lacks the improved packaging and performance of the preferred embodiment.

There is also a further possibility, in accordance with a less preferred embodiment of the present invention, of not cooling the propellant gas which is delivered to pressurize the oxidizer-fluid source. In this case, the hot gas would decompose a small amount of oxidizer in the oxidizer-fluid source and the decomposed oxidizer would then pressurize the oxidizer-fluid source. While this option offers certain benefits, it also requires careful control of the amount of decomposition achieved in order to pressurize the oxidizer-fluid source.

Systems according to the invention provide improved packaging and performance over known systems, such as hydrazine-based or solid propellant-based propulsion/ attitude control systems. The use of hybrid and/or bi-fluid propellant technology provides reliable re-ignition and throttling capabilities compared to pure solid fuel engines, while also being extremely safe and virtually explosion proof. The igniter consists of combusted propellant, which functions either as the ignition fluid for hybrid technology or as both the ignition fluid and fuel source for bi-fluid technology.

Other objects, aspects and advantages of the invention will be apparent to those skilled in the art upon reading the specification and appended claims which, when read in conjunction with the accompanying drawings, explain the principles of this invention.

BRIEF DESCRIPTION OF THE SEVERAL VIEWS OF THE DRAWING

The accompanying drawings serve to elucidate the principles of this invention. In such drawings:

FIGS. 3 and 4 are views similar to that of FIG. 2 for other embodiments of engines that may be used in the system of FIG. 1.

DETAILED DESCRIPTION OF THE INVENTION

Figure 1:
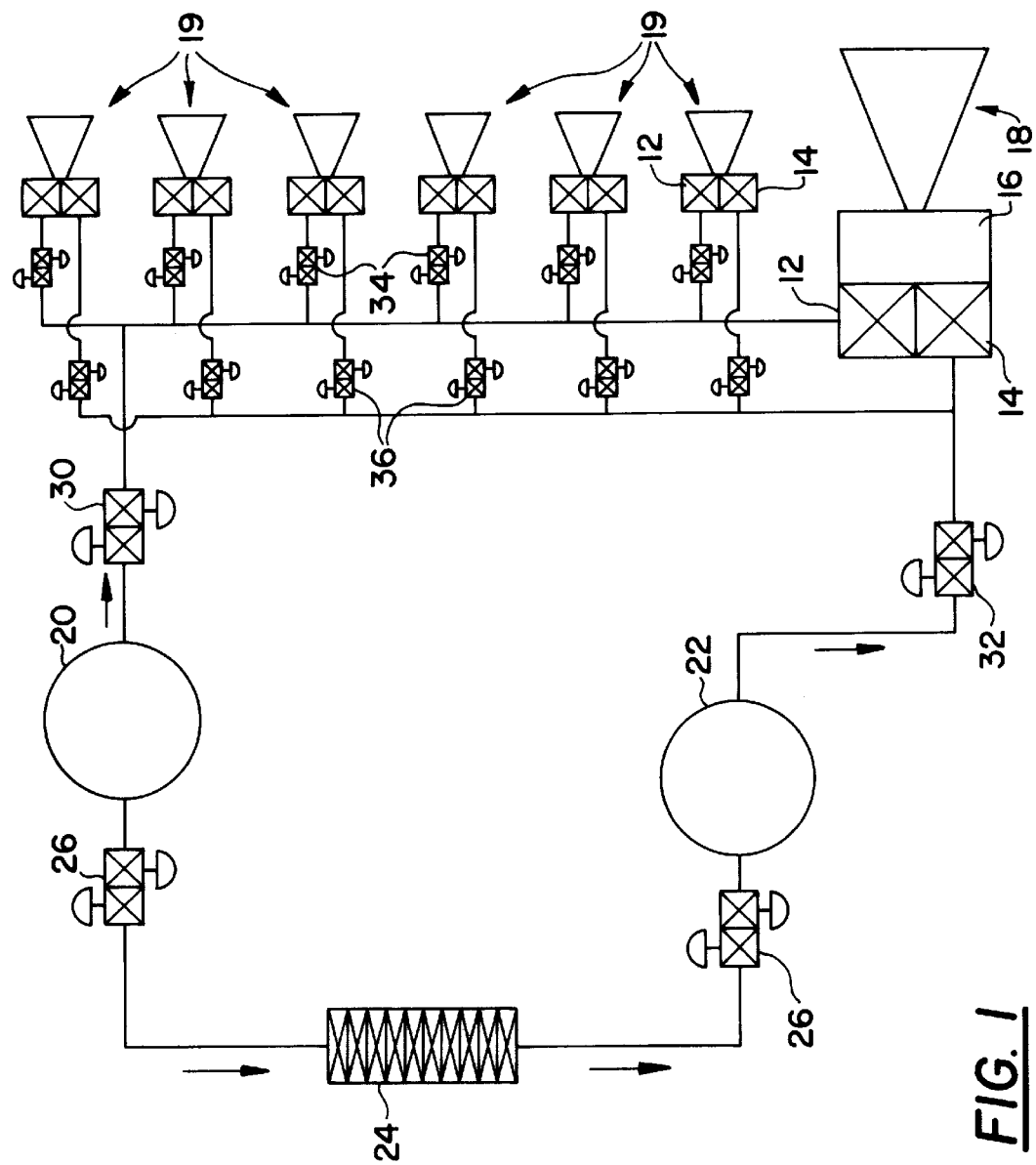
FIG. 1 is a schematic diagram of a preferred embodiment of a propulsion system according to the invention.

FIG. 1 illustrates one embodiment of a propulsion system according to an embodiment of this invention. The illustrated embodiment represents an example of a lay-out of a space vehicle propulsion system, which includes an axial main engine 18 and a plurality of attitude-control engines 19. The main engine 18 undertakes primary responsibility for propelling the vehicle, while the attitude-control engines 19 are primarily responsible for controlling the vehicle attitude. However, the functions of engines 18 and 19 are not limited to these respective primary responsibilities. To the contrary, the attitude-control engines 19 can be operated to aid engine 18 in the propulsion of the vehicle. As for the main engine 18, it can itself be gimbaled or its thrust vector gimbaled by a movable nozzle to perform attitude control functions. The vectoring of the main engine 18 is a practice known in the art. All, some, or none of the engines 18 and 19 can be a hybrid motor containing a solid fuel grain. On the other hand, all, some or none of the engines 18 and 19 can be a bi-fluid motor free of a solid fuel grain.

In the embodiment shown in FIG. 1, each of the engines 18 and 19 includes two controllable fluid delivery devices (or injectors) 12 and 14 and a combustion chamber 16 (shown for engine 18; not shown for engines 19).

The illustrated system further includes an ignition-gas subsystem 20 and an oxidizer-source subsystem 22. The ignition gas subsystem 20 functions to furnish a hot ignition gas to the propulsion system, the hot ignition gas optionally being a fuel-rich gas. The oxidizer-source subsystem 22 furnishes at least one oxidizer fluid to the propulsion system. The illustrated system further comprises a coolant bed 24 positioned along a pathway connecting the subsystems 20 and 22. The flow of hot ignition gas from subsystem 20 (through coolant bed 24) to subsystem 22 is controlled by flow control valves 26. The illustrated system comprises additional flow control valves, including the following: valve 30 positioned along a fluid pathway connecting the subsystem 20 to fluid delivery devices 12; valve 32 positioned along a fluid pathway connecting the subsystem 22 to fluid delivery devices 14; valves 34 respectively positioned in operative relation to a corresponding one of fluid delivery devices 12 to control the flow of ignition fluid to individual devices 12; and valves 36 respectively positioned in operative relation to a corresponding one of fluid delivery devices 14 to control the flow of oxidizer fluid to individual devices 14.

In the event that the engines 18 and 19 are hybrid engines containing a solid fuel grain, the gas supplied by subsystem 20 serves as a hot ignition gas for igniting each of the solid fuel engines 18 and 19. On the other hand, in the event that the engines 18 and 19 are bi-fluid engines, the gas supplied by subsystem 20 serves as both a fuel and hot ignition fluid for each bi-fluid engine.

The propellant formulation for producing the igniter/fuel fluid of subsystem 20 can be selected based on relevant temperature and fuel content requirements of hybrid or bi-fluid engines, such requirements being known in the art. Control of the generation of hot gas in subsystem 20 can also be based on standard practice in the art. For example, the subsystem 20 can include a single propellant or multiple propellants to generate the fluid need for engines 18 and 19. If one or more of the engines 18 and 19 is a bi-fluid engine, the propellant selected to produce the gas of subsystem 20 preferably is richer in fuel component, since a solid fuel grain is not located within the combustion chamber of engines 18 and 19 if the engines 18 and 19 are bi-fluid engines. If all of engines 18 and 19 are hybrid rocket engines containing solid fuel in the combustion chambers, the propellant of subsystem 20 need not include a fuel-rich component.

An exemplary propellant formulation of subsystem 20 comprises 60–80 wt % ammonium nitrate and/or ammonium perchlorate oxidizer immobilized within a hydroxy-terminated polybutadiene (HTPB) binder. Other optional ingredients of the propellant formulation of subsystem 20 include organic oxidizers such as nitramines (HMX, RDX, CL-20, and others) and other fuel-rich ingredients such as dihydroxy glyoxime (DHG), diaminofurazan (DAF), triamino guanidine nitrate (TAGNIT), nitroguanidine, guanidine nitrate, oxamide, and other ingredients known to practitioners skilled in the art of bi-fluid fuel means. Other well-known binder systems such as glycidyl azide polymer (GAP), polyglycidyl nitrate (PGN), oxetanes, carboxy-terminated polybutadiene (CTPB), polyesters, thermoplastic elastomers, polyethers, and the like are appropriate for the propellant of the subsystem 20, and can be used in addition to or as an alternative for the above-mentioned HTPB binder system. Formulation tailoring is possible to optimize the performance of engines 18 and 19 with the oxidizer of the subsystem 22.

In the event that hybrid fuel grains are contained in engines 18 and 19, the hybrid fuel grains can contain similar ingredients to the propellant(s) of subsystem 20, although it is envisioned that additional metal fuels (such as boron, beryllium, aluminum, and/or magnesium and/or hydrides of such metals) can be included to increase overall system energy and energy density. While the propellants of subsystem 20 are not prohibited from using the aforementioned metals, metal addition is not the preferred embodiment due to the undesirability of flowing the metals through valves 26, 30, and 34.

If one or more of the engines 18 or 19 is a bi-fluid engine not containing its own solid fuel supply within the combustion chamber, the fuel-rich gas from subsystem 20 constitutes the engine fuel which undergoes combustion in the presence of the oxidizer from subsystem 22 to produce the desired engine thrust. The fuel-rich gas is generated by a solid fuel combustion reaction which causes that gas to have a sufficiently high temperature to act as an igniter and fuel in the presence of the oxidizer. Subsystem 20 contains a single or plurality of solid fuel grains within or manifolded to the accumulation tank of subsystem 20 by means known and practiced in the art. Standard solid propellant ignition means such as electricity or optically initiated squibs are used for each of the solid fuel grains. Should a plurality of grains be used in subsystem 20, standard means of protecting the second and subsequent grains from premature ignition, such as elastomer barriers, frangible bulkheads, and insulated burst discs, can be employed.

For a hybrid rocket engine 18 or 19 having a solid fuel grain loaded in the combustion chamber, the igniter fluid from subsystem 20 serves primarily to ignite the solid fuel grain in the presence of the oxidizer fluid furnished by subsystem 22. However, the gas from subsystem 20 also undergoes combustion in the presence of the oxidizer and thus contributes at least marginally to the thrust generated by the engine.

If all of the engines 18 and 19 are hybrid engines containing solid fuel grains, then the gas supplied by subsystem 20 does not have to be fuel-rich and need only be supplied to each engine at a temperature sufficient to ignite the solid fuel grain in the presence of the oxidizer.

According to a particular novel feature of the invention, the oxidizer supplied by subsystem 22 contains, and preferably consists of, HAN or HAP, or a comparable advanced oxidizer, in an aqueous solution, slurry, or gel, depending on the application. For example, HAN would be preferred where no HCl is desired in the exhaust. On the other hand, HAP is preferred where maximum energy performance is desired. HAN or HAP both provide high density, good energy, and non-toxic/non-caustic attributes. The HAN or HAP concentration in such a solution determines, among other things, the freezing point of the solution. See U.S. Pat. No. 4,527,389 to Biddle, the complete disclosure of which is incorporated herein by reference. The freezing point tends to rise as the HAN or HAP concentration increases. Thus, the concentration will be selected based primarily on the desired freezing point for the particular end use, since all other considerations would dictate that the highest possible concentration be used.

The oxidizer can further contain a small amount of an additive which increases the energy density of the mixture in each engine combustion chamber. This additive may consist of, or contain, one or more nitramines such as HMX, RDX, CL-20, additional oxidizer such as AN, and freezing point depressants such as the following: alkylammonium nitrate salts, such as tetramethyl ammonium nitrate and triethyl ammonium nitrate (TEAN); hydrazinium nitrates and alkylhydrazinium nitrates; alkylhydroxylammonium nitrates, such as methane-bis-(O-hydroxylamine) dinitrate (MBODN) diethylhydroxylamine nitrate (DEHAN), N,O-dimethylhydroxylamine nitrate (DMHAN); and others, including O-methylhydroxlamine nitrate (OMHAN) guanidine nitrate, hydroxyl amine phosphate (HAPT), dimethylsulfoxide (DMSO), and TREN3 (tris(2-aminoethyl)amine trinitrate) in amounts consistent with the freezing point and energy content requirements of the system. Long term stabilization compounds may also be required based on storage life requirements. An exemplary liquid oxidizer formulation is comprised of 70 wt % HAN, 15 wt % AN, and 15% water. Another exemplary liquid oxidizer formulation comprises 85 wt % HAP, and 15 wt % water.

As discussed above, one of the functions of subsystem 20 is to furnish gas to the engines 18 and 19 for ignition purposes. Gas from subsystem 20 can be delivered to coolant bed 24 and then, after having been cooled sufficiently to be incapable of decomposing or volatilizing the oxidizer, can be permitted to flow to subsystem 22, where the gas acts to pressurize the oxidizer in subsystem 22. If gas from subsystem 20 is used to pressurize subsystem 22, it is highly desirable to keep the subsystems 20 and 22 separated. Although not shown, subsystem 22 can comprise a tank equipped with a piston or bladder or comparable device that physically separates the pressurization gas supplied by subsystem 20 from the oxidizer fluid of subsystem 22, thereby preventing reaction between the pressurization gas and oxidizer.

The flow of liquid to and from coolant bed 24 is controlled by operation of valves 26 to maintain a pressure in subsystem 22 that will ensure an adequate and acceptable flow rate of oxidizer fluid to all of the engines 18 and 19.

The invention may be applied to systems in which: (a) each of the engines 18 and 19 is a hybrid engine having a solid fuel; (b) each of the engines 18 and 19 is a bi-fluid engine; and (c) a combination of hybrid and bi-fluid engines are selected as the engines 18 and 19.

In the case of embodiment (b) or (c), the hot gas supplied by subsystem 20 will be selected to enhance its performance as a fuel in comparison with embodiment (a), since one or more of the engines 18 and 19 will be without a fuel grain.

In the case of embodiment (c), the most typical arrangement will be one in which only engine 18 is a hybrid engine containing a solid fuel. However, variations of embodiment (c) can also include arrangements in which any one or more of the engines 19 are solid fuel engines and engine 18 is either a solid fuel engine or a gas fuel engine (or a self-deflagrating monopropellant engine).

Although not shown in FIG. 1, it is within the scope of this invention to provide a propulsion system that does not contain an axial main engine, so that the primary thrust is obtained by the combination of the eccentric engines 19. It is also within the scope of this invention to provide a plurality of main engines that collectively form a concentric ring about the axis of the rocket assembly.

The supply of hot gas from subsystem 20 to the group of engines 18 and 19 is controlled by a main flow control valve 30. For individually controlling the supply of hot gas from subsystem 20 to individual engines 19, there is also provided flow control valves 34, with each of the flow control valves 34 being positioned in relation to an injector 12 of a corresponding engine 19. Although not shown, additional flow control valves can be used downstream of control valve 30 to control the supply of hot gas to the engine 18 independently of the flow of hot gas to engines 19. The supply of oxidizer from subsystem 22 to the group of engines 18 and 19 is controlled by a main flow control valve 32. The supply of oxidizer from subsystem 22 to individual engines 18 and 19 is individually controlled by flow control valves 36, each of which corresponds to an injector 14 of a corresponding engine 19. All of the valves 30–36 can be electrically controlled valves operated by the control system of the vehicle in which the propulsion system is installed. The operating sequence of the valves will be determined by the vehicle propulsion and guidance requirements in accordance with flow control principles and practices known in the art.

Figure 2:
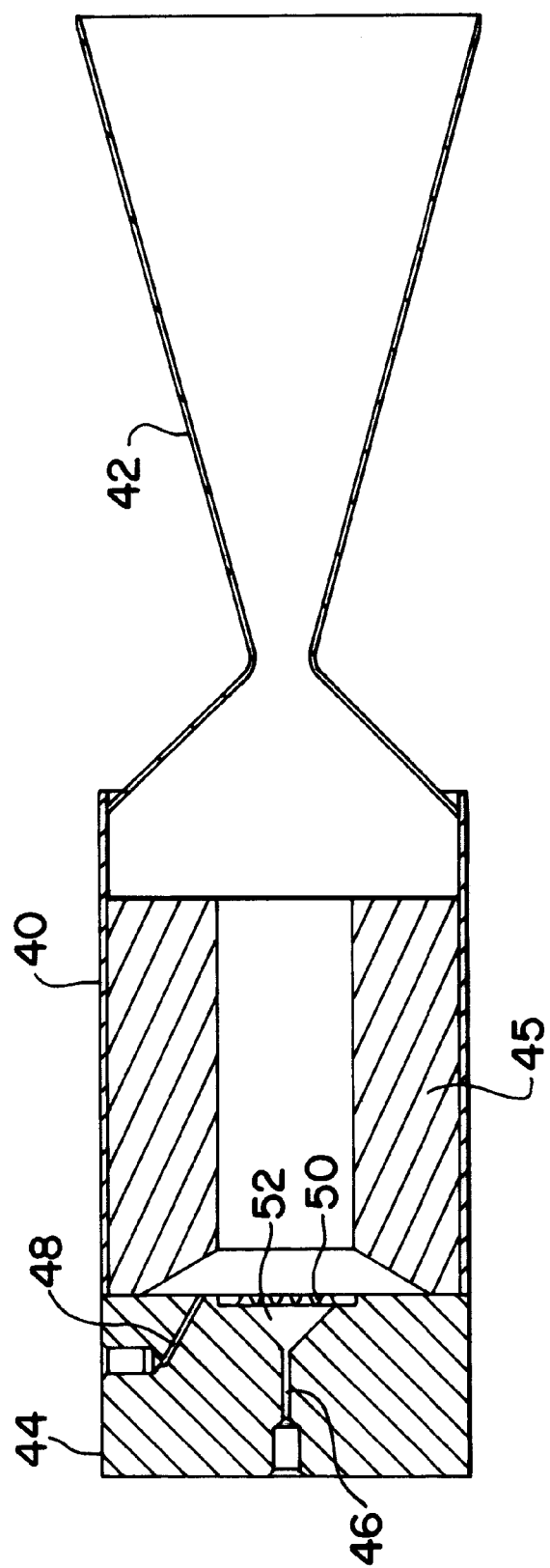
FIG. 2 is a cross-sectional view of one embodiment of an engine that may be used in the system of FIG. 1.

One embodiment of a hybrid engine which may be employed in a system according the present invention is illustrated in cross section in FIG. 2. This engine includes a housing 40 enclosing a combustion chamber (unnumbered) containing a solid fuel grain 45, an exhaust nozzle 42 extending aftwardly from housing 40 and a manifold block 44 secured forward of the housing 40 and containing an oxidizer feed channel 46 for delivery of pressurized oxidizer liquid from subsystem 22 and a gas feed channel 48 for delivery of hot ignition gas from subsystem 20. Oxidizer is conducted from the oxidizer feed channel 46 to an injector plate 50 via a manifold 52. The injector plate 50 contains a plurality of outlet orifices.

When the main engine 18 of the system shown in FIG. 1 is a hybrid engine as shown in FIG. 2, the valve 32 influences the feed of oxidizer from subsystem 22 to the oxidizer feed channel 46 and the valve 30 influences the feed of gas from subsystem 20 to the gas feed channel 48. If one or more of the attitude-control engines 19 is a hybrid engine as shown in FIG. 2, then the oxidizer feed channels 46 of the attitude-control engines 19 are each operatively connected to a respective one of the valves 36 and the gas feed channels 48 of the engines 19 are each operatively connected to a respective one of the valves 34.

FIG. 3 is a cross-sectional view showing one embodiment of a bi-liquid engine, i.e., a gas fuel engine, that can be employed in the practice of the invention. Those components that are identical to corresponding components in FIG. 2 will not be described again, but are designated by like reference numerals. In FIG. 3, the housing 40 does not contain a solid fuel grain. A manifold block 54 includes an oxidizer delivery channel 46, and an annular hot ignition and fuel gas delivery channel 58 for delivering the hot ignition and fuel gas into the combustion chamber, where the fuel component of the hot ignition and fuel gas will undergo combustion in the presence of the oxidizer. Fuel gas delivery channel 58 is connected to valve 30 or a valves 30 and 34, depending on whether the engine is the axial engine 18 or one of the array of attitude control engines 19. The fuel delivery channel 58 may provide an annular sheet of gas or may be an annular manifold directing gas to a plurality of injection orifices at the interface of the manifold block 54 and housing 40.

FIG. 4 shows a second embodiment of a gas fuel engine having a manifold block 64 provided with two injector plates 66, two oxidizer delivery channels 68, and two hot ignition and fuel gas delivery channels 70.

The injector plates 66 are connected to respective ones of the channels 68 and each have a plurality of outlet orifices, or nozzles. The number and/or diameter of the orifices in one of the plates 66 differs from that of the other plate 66, so that each of the plates 66 will produce its own, distinct oxidizer flow rate. Each of the channels 68 is connected to a respective valve operable to deliver oxidizer to its corresponding injector plate 66 in order to cause combustion to occur at a selected, and thus variable, rate. The valves can both be opened to produce a maximum combustion rate.

The channels 70 are respectively connected to corresponding valves operable to deliver hot ignition/fuel gas to the combustion chamber. Each of the illustrated channels 70 has an annular form, as described previously, to distribute the flow of hot gas uniformly around the axis of the combustion chamber. The channels 70 are each connected to a respective valve operable to deliver hot gas to the channel 70. The flow rates of hot ignition/fuel gas through the channels 70 can be controlled by dimensioning the channels 70 appropriately and controlling the valves as a function of the flow rate of oxidizer through channels 68. The valves connected to channels 70 can both be opened, at least when the valves connected to channels 68 are both opened, to produce a maximum combustion rate.

Embodiments of the invention are particularly suitable as upper stages of multistage rocket boosters, in particular commercial launch vehicles, and ballistic missiles. The invention allows both propulsion and attitude to be controlled by a single system.

The foregoing detailed description of the preferred embodiments of the invention has been provided for the purposes of illustration and description. It is not intended to be exhaustive or to limit the invention to the precise embodiments disclosed. Modifications and variations will be apparent to practitioners skilled in this art. For example, it should be understood that the embodiments shown in FIGS. 3 and 4 can also be modified as solid fuel hybrid engines by introduction of a solid fuel grain into the combustion chamber. Additionally, it is possible for one or more of the engines 18 and 19 to be reverse hybrid rocket engines, so that a solid oxidizer-rich grain is loaded into the combustion chambers of the hybrid rocket engines. In this embodiment, suitable solid oxidizer grains include, by way of example, fluorinated polymers with high percentages of AP or other oxidizers and with or without metal fuels as described above. Representative fuels that can be supplied to the combustion chambers in a fluid state include, by way of example, the fuel-rich formulations described for subsystem 20 above.

The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A rocket motor assembly having a longitudinal axis and comprising a propulsion system, said propulsion system comprising:
   an array of eccentric rocket engines offset from the longitudinal axis of said rocket motor assembly to permit attitude control of said rocket motor assembly by independent firing of a selected one or group of said eccentric rocket engines, said eccentric rocket engines each comprising a respective combustion chamber;
   one or more oxidizer-fluid sources in operative communication with said eccentric rocket engines to permit oxidizer fluid to be supplied to said selected one or group of said eccentric rocket engines;
   one or more ignition-fluid sources in operative communication with said eccentric rocket engines to permit ignition fluid to be supplied to said selected one or group of said eccentric rocket engines for initiating a combustion reaction between said oxidizer fluid and a fuel component;
   a flow pathway connecting one or more of said oxidizer-fluid sources to one or more of said ignition-fluid sources; and
   at least one cooling device positioned along the pathway for cooling said ignition fluid and permitting said ignition fluid to pressurize said oxidizer fluid in one or more of said oxidizer-fluid sources.

2. A rocket motor assembly having a longitudinal axis and comprising a propulsion system, the propulsion system comprising:
   an array of eccentric rocket engines offset from the longitudinal axis of said rocket motor assembly to permit attitude control of said rocket motor assembly by independent firing of a selected one or group of said eccentric rocket engines, said eccentric rocket engines comprising a plurality of hybrid rocket engines each comprising a respective combustion chamber and a respective solid fuel grain housed in said respective combustion chamber;
   one or more oxidizer-fluid sources in operative communication with said eccentric rocket engines to permit oxidizer fluid to be supplied to said hybrid rocket engines; and
   one or more ignition-fluid sources in operative communication with said eccentric rocket engines to permit ignition fluid to be supplied to said hybrid rocket engines for initiating a combustion reaction between said oxidizer fluid and said respective solid fuel grain.

3. The rocket motor assembly of claim 2, wherein said propulsion system further comprises a primary axial rocket engine constructed and arranged to produce thrust along a longitudinal axis of said rocket motor assembly.

4. The rocket motor assembly of claim 3, wherein said primary axial rocket engine is a hybrid rocket motor in fluid communication with one or more of said oxidizer-fluid sources.

5. The rocket motor assembly of claim 2, wherein said propulsion system further comprises a plurality of primary rocket engines constructed and arranged to collectively produce thrust along the longitudinal axis of said rocket motor assembly.

6. The rocket motor assembly of claim 5, wherein said primary rocket engines are hybrid rocket motors in fluid communication with one or more of said oxidizer-fluid sources.

7. The rocket motor assembly of claim 2, further comprising one or more oxidizer-fluid control valves, each of said oxidizer-fluid control valves controlling flow of said oxidizer fluid from said one or more oxidizer-fluid sources to a respective one or group of said hybrid rocket engines.

8. The rocket motor assembly of claim 7, wherein each of said oxidizer-fluid control valves permit variable control of said oxidizer fluid to said respective one or group of said hybrid rocket engines.

9. The rocket motor assembly of claim 2, further comprising at least one cooling device positioned at a pathway connecting one or more of said oxidizer-fluid sources to one or more of said ignition-fluid sources to permit said ignition fluid to be cooled and to pressurize said oxidizer fluid in said oxidizer-fluid sources.

10. The rocket motor assembly of claim 2, wherein said ignition fluid includes a fuel that is combustible with said fluid oxidizer.

11. The rocket motor assembly of claim 2, further comprising one or more ignition-fluid control valves, each of said ignition-fluid control valves controlling flow of said ignition fluid from said one or more ignition-fluid sources to a respective one or group of said hybrid rocket engines.

12. The rocket motor assembly of claim 1, wherein said eccentric rocket engines comprise a plurality of bi-fluid rocket engines in which said ignition fluid and said fuel component are the same, and further wherein said ignition fluid is sufficiently fuel rich and hot to initiate a combustion reaction between said oxidizer fluid and said ignition fluid.

13. The rocket motor assembly of claim 12, wherein said propulsion system further comprises a primary axial rocket engine constructed and arranged to produce thrust along a longitudinal axis of said rocket motor assembly.

14. The rocket motor assembly of claim 13, wherein said primary axial rocket engine is in fluid communication with one or more of said oxidizer-fluid sources.

15. The rocket motor assembly of claim 12, wherein said propulsion system further comprises a plurality of primary rocket engines constructed and arranged to collectively produce thrust along the longitudinal axis of said rocket motor assembly.

16. The rocket motor assembly of claim 12, further comprising one or more oxidizer-fluid control valves, each of said oxidizer-fluid control valves controlling flow of said oxidizer fluid from said one or more oxidizer-fluid sources to a respective one or group of said bi-fluid rocket engines.

17. The rocket motor assembly of claim 16, wherein each of said oxidizer-fluid control valves permit variable control of said oxidizer fluid to respective one or group of said bi-fluid rocket engines.

18. The rocket motor assembly of claim 12, further comprising one or more ignition-fluid control valves, each of said ignition-fluid control valves controlling flow of said ignition fluid from said one or more ignition-fluid sources to a respective one or group of said bi-fluid rocket engines.

19. The rocket motor assembly of claim 19, wherein each of said initiator-fluid control valves permit variable control of said initiator fluid to said respective one or group of said bi-fluid rocket engines.

* * * * *

UNITED STATES PATENT AND TRADEMARK OFFICE
CERTIFICATE OF CORRECTION

PATENT NO. : 6,393,830 B1  Page 1 of 1
DATED : May 28, 2002
INVENTOR(S) : Rolf E. Hamke and Eric M. Rohrbaugh It is certified that error appears in the above-identified patent and that said Letters Patent is hereby corrected as shown below:

<u>Title page,</u>
Item [54], Title, delete "HYBRID" and "HYBRID OR FLUID"

Signed and Sealed this

Seventeenth Day of February, 2004

JON W. DUDAS
*Acting Director of the United States Patent and Trademark Office*